United States Patent [19]

Soot

[11] 4,034,227

[45] July 5, 1977

[54] NUCLEAR FUEL STORAGE RACK

[76] Inventor: Olaf Soot, 9 Tomahawk Lane, Greenwich, Conn.

[22] Filed: Feb. 2, 1976

[21] Appl. No.: 654,475

[52] U.S. Cl. .............................. 250/507; 250/518
[51] Int. Cl.² .......................................... G21F 5/00
[58] Field of Search .......... 250/506, 507, 515, 518; 176/30, 87

[56] References Cited

UNITED STATES PATENTS

| 3,466,445 | 9/1969 | Schlies | 250/507 |
| 3,859,533 | 1/1975 | Suvanto | 250/507 |

Primary Examiner—Davis L. Willis

[57] ABSTRACT

A nuclear fuel storage rack for high density nuclear fuel storage inside a fuel pool is described. The rack is a honeycomb structure built up from modules joined at their corners in checkerboard fashion to form a strong, rigid structure affording good resistance against seismic loads.

18 Claims, 11 Drawing Figures

NUCLEAR FUEL STORAGE RACK

This invention relates to a nuclear fuel storage device or system.

It is conventional in nuclear power stations and like facilities to provide a fuel storage pool for storing fresh nuclear fuel before use and spent fuel after use. Generally the fuel, which is in the form of elongated assemblies of radioactive fuel pins, typically about 15 feet tall by 5½–7½ inches square in cross-section, is stored underwater in racks mounted on the pool floor. To avoid excessive activity, the practice is to separate the individual assemblies by a considerable distance to increase the thickness of the water moderator between the assemblies. This has resulted in several difficulties. First, the consequent low packing density of fuel assemblies means fewer total number of assemblies can be stored in existing pools. Second, existing rack constructions may have limited ability to withstand seismic loads. Third, existing rack constructions are not readily adapted without excessive engineering for construction within pools of varied sizes and configurations.

An object of the present invention is a storage rack construction providing increased fuel assembly packing density.

Another object of the invention is a storage rack construction which will readily withstand seismic loads and which can be built and installed at reasonably low cost.

Still a further object of the invention is a storage rack construction that is readily accommodated within existing pools whatever their configuration or size.

These and further objects of the invention as will appear hereinafter are realized, briefly stated, by a storage rack assembly construction comprising a plurality of elongated walled enclosures joined together to form a rigid honeycomb structure whose holes or cavities, which will be called the fuel assembly receiving slots herein, are all parallel and rectangular or square in cross-section. In accordance with one aspect of the invention, each rack assembly is built up of from identical modular slot enclosures joined at their corners in checkerboard fashion so that each enclosure forms approximately two fuel storage slots.

In accordance with another aspect of the invention, each slot enclosure wall is provided with elongated grooves for housing and protecting poison pins or rods to permit closer packing of spent fuel.

In accordance with still another aspect of the invention, the honeycomb structure is further strengthened with a top stiffener frame which locks the poison pins in place and serves to guide fuel asemblies during lowering and lifting operations.

These and further features and advantages of the invention will best be understood from the detailed description that follows of several preferred embodiments of the invention, taken in conjunction with the accompanying drawings wherein:

Figure 1:
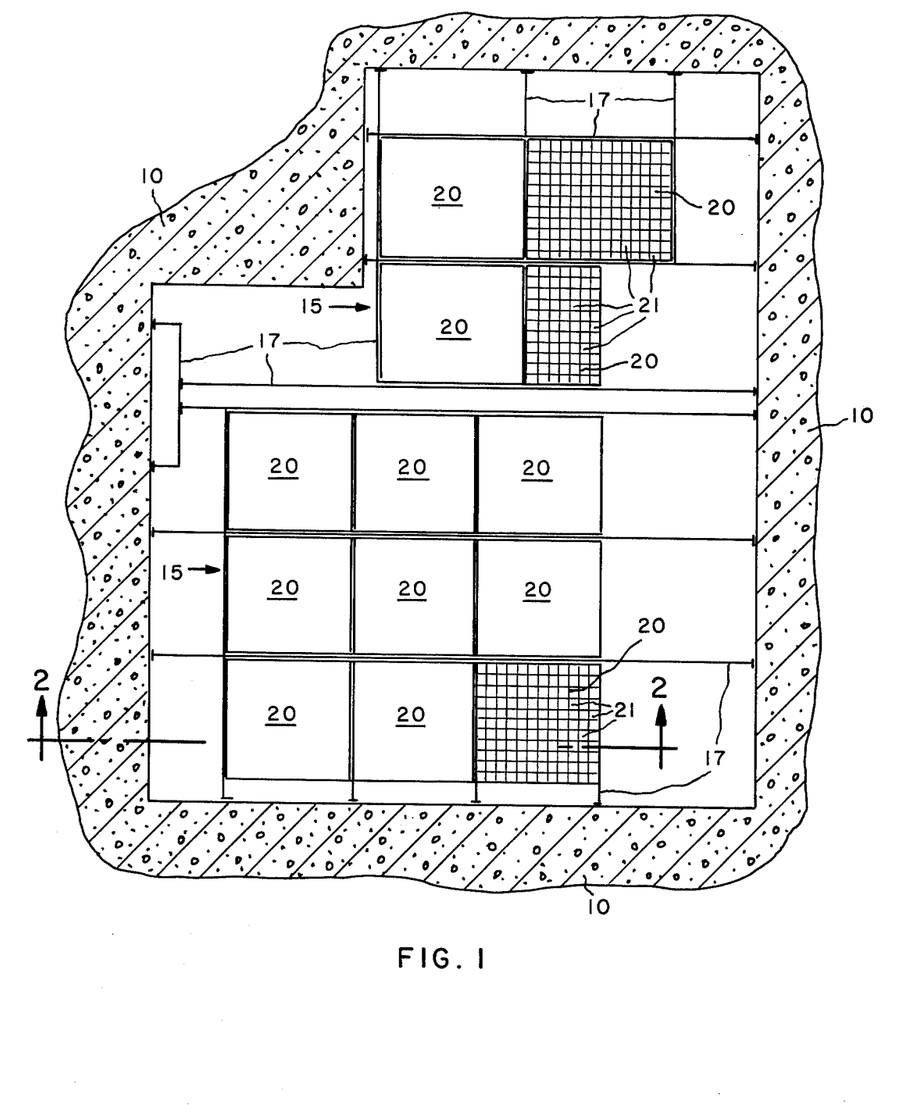
FIG. 1 is a schematic plan view from the top of a fuel storage pool incorporating a storage rack in accordance with the invention.
Figure 2:
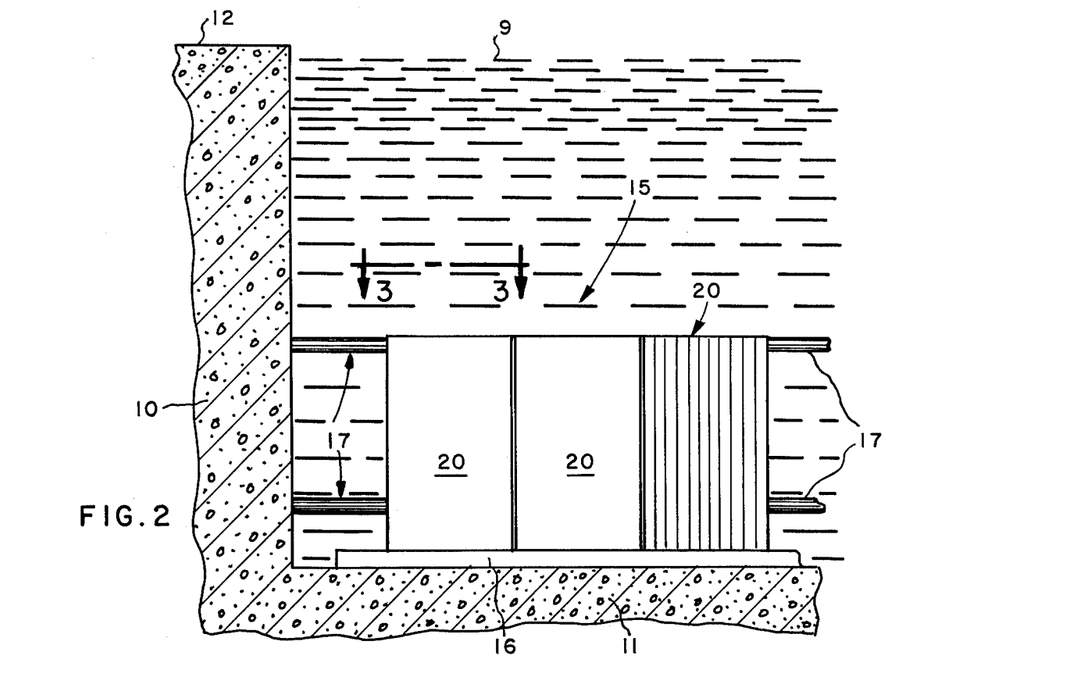
FIG. 2 is a schematic, partial cross-sectional view of the pool of FIG. 1 along the line 2—2.

Referring now to the drawings, FIG. 1 is a plan view from the top and FIG. 2 a partly cross-sectional view of a fuel storage pool of the type that can be found in nuclear power stations, or can be used in fuel reprocessing plants. The pool comprises a concrete enclosure or well constituted of side walls 10 and a bottom floor 11 housing a pool of water 9. The side walls 10 terminate at the top at the refueling floor 12. Not shown is the adjacent well housing the nuclear reactor, and the usual movable door in the common wall through which fuel after being lifted out of the reactor can be transported, all under water, to a storage rack in the fuel storage pool, or vice-versa. An irregular pool outline has been chosen to illustrate the advantage of a modular construction that will readily produce rack assemblies of different configurations to fill the space desired.

A preferred form of storage rack 15 in accordance with the invention is mounted on the pool bottom wall 11 on a suitable base 16, shown schematically. If desired, additional lateral supports shown schematically at 17 can be provided between the sides of the rack 15 and the pool walls 10 to increase the resistance to seismic or other lateral loads. As will be observed from FIG. 1, two main racks are shown, of which the upper one is composed of four rack assemblies 20 and of which the lower one is composed of nine rack assemblies 20. Each assembly 20 may be described as a honeycomb structure forming a plurality of vertical slots 21 each for receiving a fuel assembly. Three of the rack assemblies 20 have been provided with crossed lines to show the slots 21.

Figure 3:
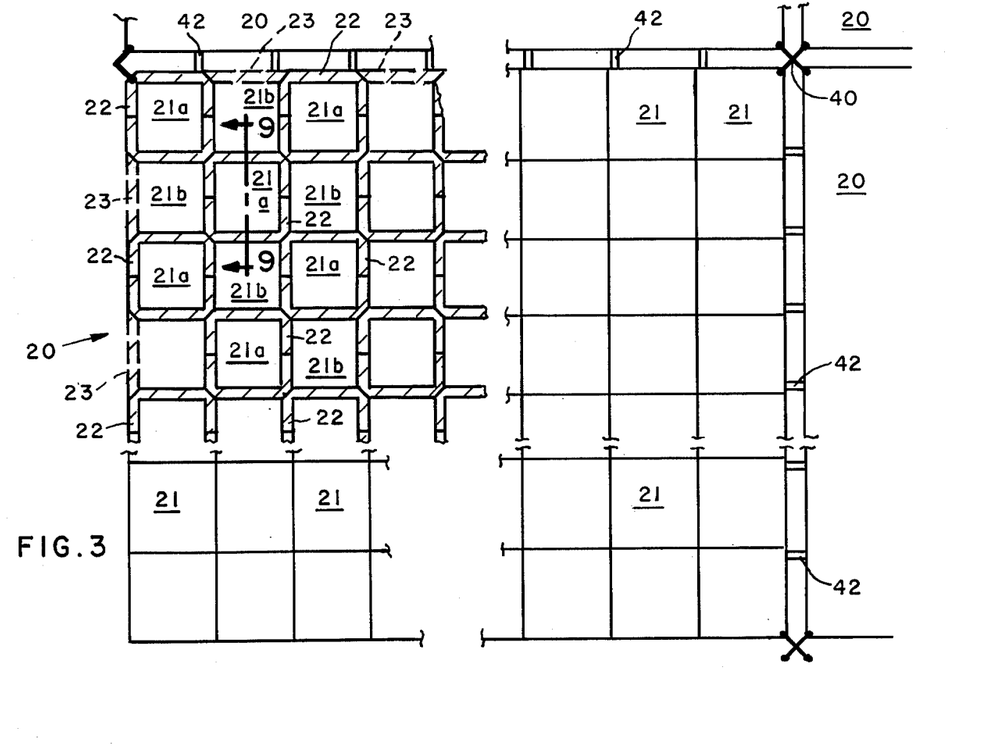
FIG. 3 is an enlarged view from the top, also done schematically, of parts of one form of rack assembly in accordance with the invention, as viewed along the line 3—3 of FIG. 2.

FIG. 3 is an enlarged plan view of one form of rack assembly 20 in accordance with the invention, located in the lowermost, left-handed corner of FIG. 1. The fitting together of the honeycomb structure is only shown schematically in the upper left-hand corner of FIG. 3, the remainder of the assembly indicated by centerlines being the same. All of the rack assemblies are constructed in a similar manner to that illustrated in FIG. 3. As will be noted, the rack assembly 20 is built up from an assembly of rectangular, square in this instance, slot enclosures 22 joined in checkerboard fashion at their corners to their neighbors to form a honeycomb of identical slots 21. As will be observed, each square enclosure 22 defines an inner slot 21a, and also forms with neighboring enclosures 22, or with an additional side enclosure panel 23 for the peripheral enclosures, an additional slot 21b. Thus, each enclosure 22 forms approximately two slots 21a and 21b, though it will be clear from the geometry that it will not be exactly two slots for each enclosure. For instance, the five enclosures 22 in the upper left hand corner of FIG. 3 form nine slots. As the number of enclosures in the assembly increases, the factor will approach more closely to two.

Figure 4:
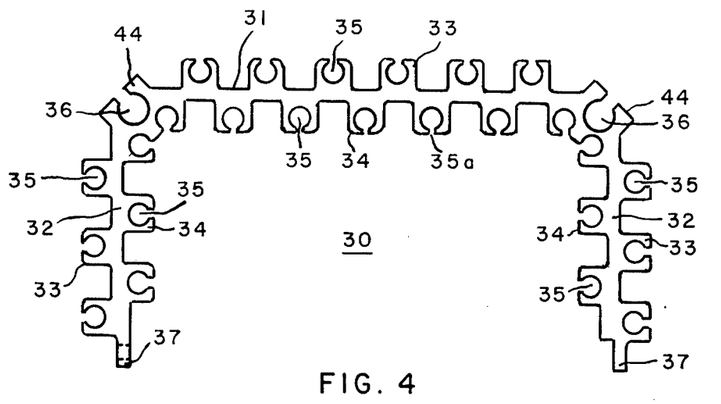
FIGS. 4–7 are detail plan views of the modular components making up the slot enclosures and interconnecting pieces for the storage rack of FIG. 3.
Figures 5, 6:
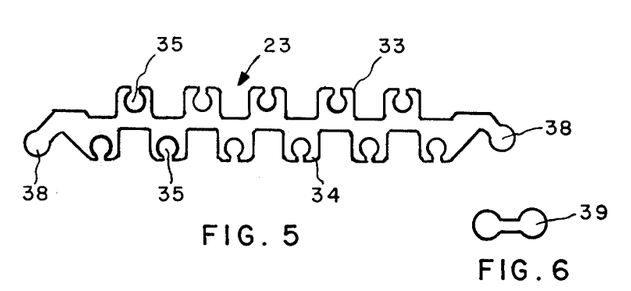

The components from which the modules are constructed are illustrated in FIGS. 4 and 5, which are end views thereof. In FIG. 4 is illustrated the basic shape of a U-shaped member 30, two of which when joined together to form a rectangle make up one slot enclosure 22. Each U-shaped member 30 may be of aluminum for a boiling water reactor (BWR) installation, and may be made preferably by extrusion or by rolling. Thus, the end view of FIG. 4 also illustrates any cross-section taken along its length, which is its dimension perpendicular to the plane of the drawing. Typical dimensions would be, for example, 14 feet long, with a full width of its side wall or bight portion 31, measured between the center lines of the right-angle projecting U arms 32 of approximately 7 inches. Each enclosure wall contains as shown a series of oppositely-directed projecting portions, with the outwardly-directed projecting portions 33 offset laterally from the inwardly-directed portions 34, each forming continuous longitudinal circular grooves 35 for receiving poison pins. In addition, each of the corners is provided with a continuous longitudinal groove 36 for receiving slot connector bars or side panel ends for interconnecting corners of adjacent slot enclosures to each other to form a rigid rack assembly. The arms of the U terminate in tongue portions 37 for connection to a similar U-shaped member.

To complete the square enclosure for the slots along the periphery of the assembly, a side enclosure panel 23 is provided, illustrated in an end view in FIG. 5. It is of the same length and approximately the same width as the U-sahped member 30, and may be made in a similar manner. It also has the offset projecting portions 33, 34 providing poison grooves 35. Each panel 23 terminates at opposite ends in a projecting rod end 38 configured to engage the corner grooves 36 of the U-shaped members 30. The slot connector bar previously referred to which also engags the corner grooves 36 is illustrated, in an end view, in FIG. 6 at 39. It, too, is of the same length as the other components of the module, and can be made in a similar manner. These three components illustrated in FIGS. 4–6 are all that is needed to construct the honeycomb part of each rack assembly 20.

Figure 7:
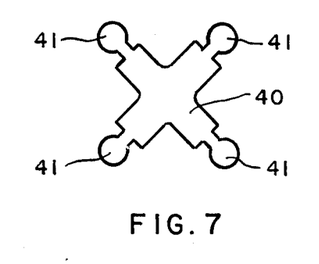

Two additional modular components can be provided to assist in building up multiple rack assembly structures. One, called a rack corner connector bar, comprises an X-shaped bar 40 illustrated in end view in FIG. 7. It is of the same length as the other modular components, can be made of the same material, and also manufactured in the same manner. Each of the ends 41 of the rack connector bar is configured to engage the corner grooves 36 of the U-shaped members for interconnecting adjacent rack assemblies to add to the rigidity of the overall structure. The remaining component is a rack side connector bar 42, which is similar in shape, length, material and method of fabrication to the slot connector bars 39 illustrated in FIG. 6 except that its ends are configured to engage the grooves 35 intended to receive the poison pins for interconnecting adjacent rack assemblies.

Figure 8:
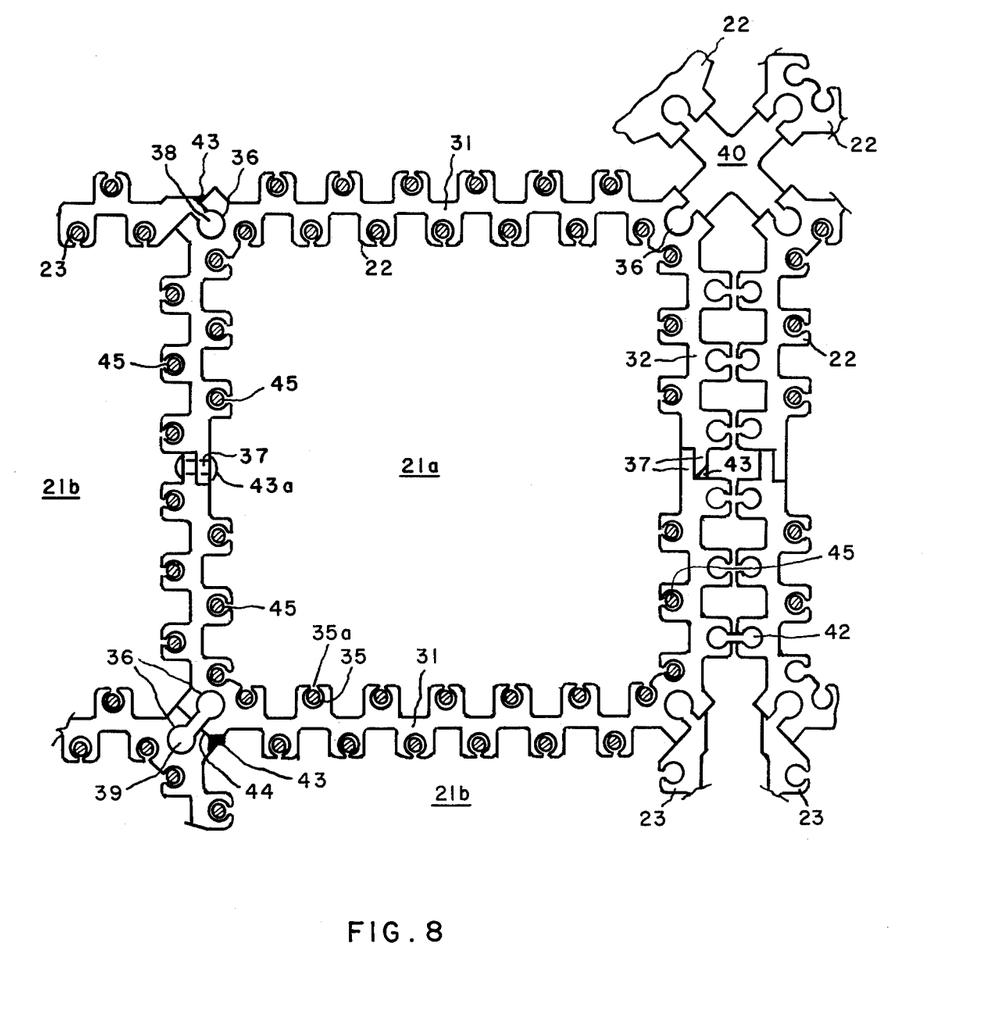
FIG. 8 is an assembled plan view of one slot enclosure and its interconnections using the modular components of FIGS. 4–7.

The manner in which the components are assembled to form the rack structure of the invention is illustrated in FIG. 8. The assembly of each rack to a desired size containing a desired number of slots can be carried out if desired at a location remote from the pool, and the individual rack assemblies joined together and mounted on their base in the pool itself. Such prefabrication of rack assemblies to any desired size determined by the number of modules present reduces greatly the installation cost of such storage structures.

As illustrated in FIG. 8, each rack enclosure rectangle is formed by joining together two of the U-shaped members 30. They are conveniently joined, as illustrated, as by welding 43 at the location of the mating tongues 37. Space spot welds 43 along the length or rivets 43a through the mating tongues can be used. The individual completed slot enclosures are then joined together at their corners to form the checkerboard pattern illustrated in FIG. 3, accomplished by inserting a slot connector bar 39 into adjacent grooves 36 at the corners of abutting slot enclosures 22. To assist in stacking the slot enclosures, the corners, as shown at 44 are bevelled at 45°. Then the slots 21b along the periphery are closed off by adding the side panels 23 into the corner grooves 36. When the assembly is completed, if desired, additional rigidity can be imparted to the structure by welding the side closure panels 23 and the slot connector bars 39 to the corners of each slot enclosure, illustrated at 43.

Each rack assembly can be separately mounted and laterally supported if desired within the pool. But the ability of the structure to resist seismic and other lateeral loads is greatly enhanced by laterally connecting together the rack assemblies. This is conveniently accomplished, as illustrated in FIG. 8, by engaging the corner grooves 36 of neighboring rack assemblies 22 with the rack corner connector bars 40. Sinmilarly, certain of the poison pin grooves 35 can be left empty and used to receive the rack side connector bars 42. As before, these rack connector bars 40 and 42 can be welded into place to enhance rigidity. Poison pins or rods, shown hatched at 45, are then added where desired into the poison pin grooves 35. Not all of the grooves 35 need be filled. The poison pins are conveniently formed by extrusion of a suitable poisoning material, such as a boron composition, which has a large capture cross-section for neutrons. The poison pins have a length approximating that of the enclosure for maximum effect. The more poison pins present, the lower will be the activity of neighboring spent fuel.

Figure 9:
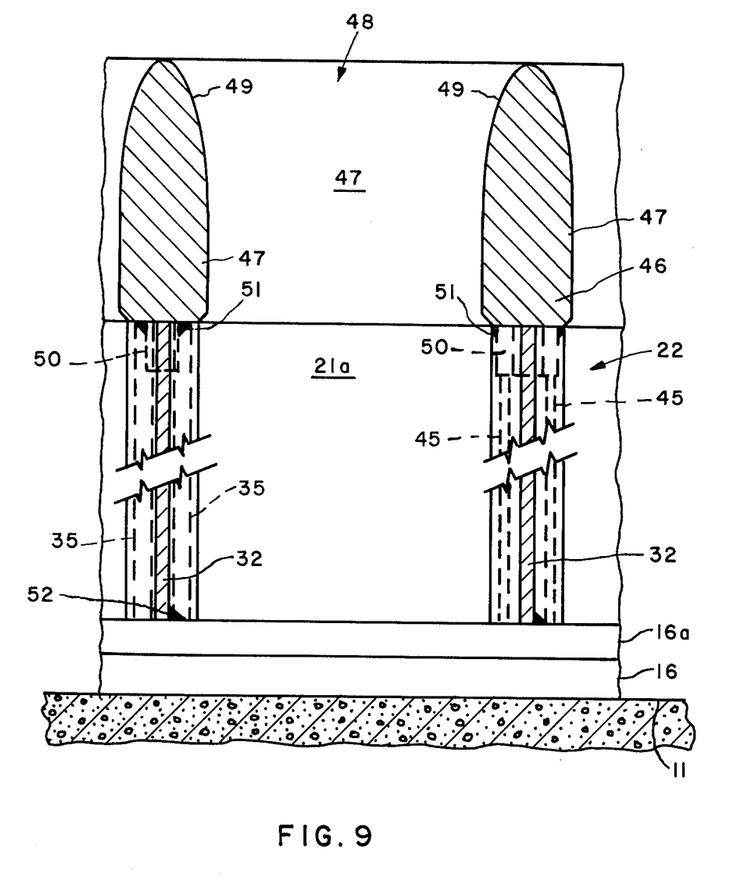
FIG. 9 is a part cross-sectional view showing the top stiffening frame mounting, taken along the line 9—9 of FIG. 3.

While the resultant rack structure can be used in the form so far described, it is preferred to add on a top stiffening frame, which, in addition to imparting greater rigidity to the overall structure, also functions to protect the top of the slot enclosures against impact loads, to lock the poison pins 45 in place, and to provide a guide for fuel assemblies during lowering and lifting operations into the slots 21a, 21b. One suitable form of stiffening frame 46 is illustrated in FIG. 9. The part illustrated is that across one slot enclosure 22, but the remainder of the frame, which would extend over the whole rack assembly, would be the same. To further strengthen the structure, adjacent top stiffener frames can be bolted or welded together.

As illustrated in FIG. 9, the stiffener frame 46 comprises a grid-like structure formed by crossed wall portions 47 located over the slot enclosure walls 32 and having openings 48 aligned with the rack slots 21a, 21b. The upper part of the frame walls is tapered 49 to act as a guide for entering fuel assemblies. The bottom of the frame is provided with spaced downwardly-projecting dowels 50 located to be received into the top of the corner grooves 36 (shown on the left-hand side) or into the top of unoccupied or occupied poison grooves 35 (shown on the right-hand side). The frames are permanently joined to each of the slot enclosures as by welding, shown at 51.

FIG. 9 also illustrates how the rack structure can be mounted on the pool bottom wall. Each rack 20 is mounted on its own base plate or frame 16a. Base plate or frame 16a can be mounted to pool bottom 11 directly or a suitable adapter plate or frame 16 can be permanently fixed to the pool bottom 11. To improve water circulation, cut-outs can be made along the base or adapter plates or frames to permit free water flow underneath the rack.

As will be clear from the foregoing descriptions, the rack structure of the invention offers a number of important advantages over the rack structures heretofore known in the art for storing nuclear fuel. Only a few basic extruded, rolled, formed, or built up modular components are needed to build up the slot enclosures and each rack assembly of whatever size and shape desired. Multiple assemblies all interlocked to form a rigid structure are easily achieved. Each enclosure wall is formed by a relatively thin section which is strengthened by the integral projecting portions forming the poison pin grooves. Thus, material use is low without sacrificing strength or rigidity. The continuous enclosure walls, and the continuous corner and poison pin grooves contribute to forming rigid shear walls offering excellent resistance against seismic or other lateral loads.

Each poison pin is enclosed and thoroughly protected over its entire length within its own groove. However it can be inspected throughout its length through the vertical slot 35a in the groove wall. The poisoning material in the form of solid rods rather than layers resists dissolution in the pool water. Neighboring fuel assemblies are separated by a first row of poison pins, the enclosure wall material, and a second row of poison pins, with the pool water filling up the remaining spaces. The poisoning material slows down the neutrons generated by active spent fuel for better capture or absorption by the intervening material or water. The offset poison pins increases the possibilility of neutron moderation and absorption. The array of poison-low weight absorber-poison contributes greatly to reducing activity allowing closer packing of the fuel-receiving slots without risk of over-reactivity resulting in higher fuel packing density and more efficient use of the available fuel storage space.

The modular construction enhances manufacturability, eases assembly, reduces construction costs, and affords an unlimited choice of rack sizes and configurations. The geometry of modular slot enclosures and side closure panels results in continuous right-angled rigid walls. The rigidity is enhanced by the top stiffener frames which provides impact protection as well as protection for the poison pins and connections between adjacent racks.

As mentioned, for a BWR, the components are preferably constituted of aluminum, though other known structural materials usable in fuel storage pools can be substituted. For a pressurized water reactor (PWR) which conventionally uses boric acid in the water, stainless steel is the preferred component material.

As an example of the packing density possible, for the dimensions previously given, a rack assembly can be constructed having overall dimensions of approximately 6.5 × 7 feet in cross-section providing 132 slots each 6 inches square for receiving fuel assemblies.

Figure 10:
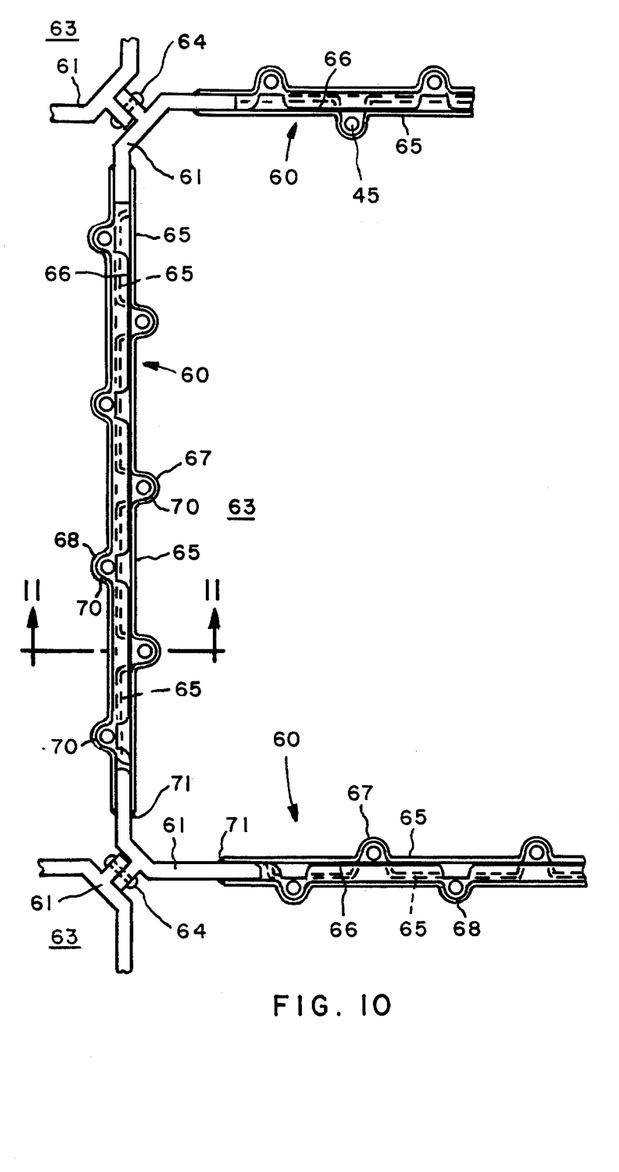
FIG. 10 is a partial plan view, similar to FIG. 8, of another form of slot enclosure in accordance with the invention, taken from the top without the stiffening frame in place.
Figure 11:
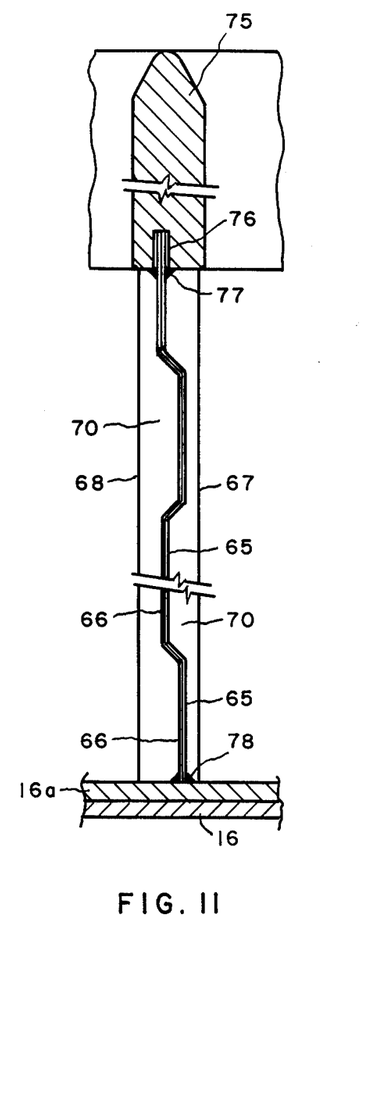
FIG. 11 is a part cross-sectional view along the line 11—11 of FIG. 10 with the stiffening frame in place.

The module illustrated in FIG. 8 is most easily formed by extrusion of aluminum, which can be used in BWRs but not in PWRs which employ boric acid in the water, for which application stainless steel is preferred. FIG. 10 in a view similar to FIG. 8 illustrates part of another module construction in accordance with the invention easily fabricated of stainless steel plates. In this embodiment, the module walls are all alike, and consist as shown of major straight parts 60 interconnected by right-angled corner pieces 61. Each module consists of four side parts 60 forming a rectangular slot enclosure 63 similar to the enclosures 22 of FIG. 8. The corner pieces 61 are beveled and have tongues to mate with the corner pieces 61 of neighboring enclosures 63 shown at the left-hand side of FIG. 10. They are conveniently joined together as for example by riveting or bolting 64 or welding. The straight parts 60 of the enclosure walls are formed of two plates 65, 66. The two plates are shaped and bent as shown in FIG. 10, and in cross-section in FIG. 11, to form, similar to FIG. 8, a series of internally 67 and externally 68 laterally offset projecting portions defining elongated grooves 70 for receiving poison pins. The ends of the plates are joined as by welding 71 to the corner pieces 61 to form a rigid unit. All the slot enclosures can be built up in the same manner to form the final honeycomb structure in which each module 63 forms approximately two slots. Similar to FIG. 9, a stiffener frame grid 75 is preferably added at the top for the same reasons that the stiffener frame 47 was added to the earlier embodiment. In this case, a recess 76 can be provided in the grid 75 to receive the enclosure walls, which are then welded 77 thereto. The walls are also welded, bolted or riveted to the base plate or frame 16a at the pool bottom. An adapter plate or frame 16 can be used for interfacing with the existing pool. All parts shown can be made of stainless steel or other well known corrosion resistant materials.

The projecting portions illustrated at 67 and 68 need not be laterally offset as shown, but instead arranged one behind the other. Where wider spacing of neighboring fuel assemblies is permissable, all of the projecting portions forming the poison pin grooves can be located either on the outside or on the inside of the slot enclosure walls. Also, the straight portions 60 can be riveted if desired rather than welded to the corner pieces 61. Still further, slots or keyways can be formed at the beveled edges of the abutting or adjacent corner pieces 61 so as to run the full length of the wall to receive keys or connecting bars similar to 39 of FIG. 8 for interconnecting neighboring slot enclosures, which as before can be strengthened by added weldments.

While my invention has been described in connection with specific embodiments thereof, those skilled in the art will recognize that various modifications are possible within the principles enunciated herein and thus the present invention is not to be limited to the specific embodiments disclosed.

What is claimed is:

1. Nuclear fuel storage rack comprising a plurality of elongated, corner-adjoining, parallel enclosures each of generally rectangular cross-section having interior slots for receiving fuel elements, and structural means permanently joining each of the fuel receiving enclosures directly to its neighboring enclosures along portions of their adjoining corners distributed along their length and in checkerboard fashion to form a rigid honeycomb structure wherein the walls of individual enclosures through their corner connections form a plurality of rigid shear walls extending in two directions across the rack and wherein the number of fuel-receiving slots present is approximately equal to twice the number of enclosures present.

2. Nuclear fuel storage rack as claimed in claim 1 wherein the enclosures are substantially identical modules, and the shear walls extend in two right angle directions each transverse to the longitudinal enclosure directions.

3. Nuclear fuel storage rack as claimed in claim 1 and further including a top stiffening frame secured to each enclosure at the top of the honeycomb structure.

4. Nuclear fuel storage rack as claimed in claim 3 and further including poison means surrounding substantially each of the fuel receiving slots.

5. Nuclear fuel storage rack for a fuel storage pool comprising a plurality of parallel, elongated, adjoining walled enclosures each of generally rectangular cross-section, and means permanently joining each of the enclosures to its neighboring enclosures to form a rigid honeycomb structure defining a plurality of fuelreceiving slots, each wall of the enclosure between the slots comprising a central portion with spaced portions integral with and projecting out from the wall forming elongated laterally-spaced receptacles for receiving a poison pin and extending parallel to the fuel enclosures, whereby adjacent fuel stored in the slots can be separated by a row of spaced poison pins and the wall material.

6. Nuclear fuel storage rack as claimed in claim 5 wherein the integral portions project from both sides of the wall whereby adjacent fuel can be separated by a first row of poison pins, the wall material, and a second row of poison pins.

7. Nuclear fuel storage rack as claimed in claim 5 wherein the oppositely projecting portions are laterally offset from each other.

8. Nuclear fuel storage rack as claimed in claim 5 and further including elongated poison pins located in some of the receptacles.

9. Nuclear fuel storage rack as claimed in claim 8 and further comprising a top stiffening frame secured to the top of the honeycomb structure over the poison pin receptacles.

10. Nuclear fuel storage rack comprising a plurality of elongated, adjoining, parallel enclosures each of generally rectangular cross-section having interior slots for receiving fuel elements, means permanently joining each of the fuel receiving enclosures to its neighboring enclosures at their corners in checkerboard fashion to form a rigid honeycomb structure wherein the number of fuel-receiving slots present is approximately equal to twice the number of enclosures present, said enclosures having longitudinally-extending corner grooves, the corner joining means comprising elongated bars engaging the corner grooves in adjacent enclosures, a top stiffening frame secured to the top of the honeycomb structure, and means for mounting said honeycomb structure within a fuel storage pool.

11. Nuclear fuel storage rack as claimed in claim 10 wherein the enclosures are identical modules, and further including identical side panel members each joined to neighboring enclosures along the periphery of the honeycomb.

12. Nuclear fuel storage rack as claimed in claim 11 wherein the enclosures are each constituted of two interconnected U-shaped members joined at the ends of their U arms to form a rectangle.

13. Nuclear fuel storage rack as claimed in claim 12 wherein each U-shaped member and the side panel members are extruded members.

14. Nuclear fuel storage rack as claimed in claim 11 wherein the enclosure walls and side panel members each include longitudinally-directed, parallel, projecting portions defining grooves for receiving poison pins.

15. A fuel storage rack system comprising a plurality of storage racks as claimed in claim 10 and further comprising an elongated X-shaped bar engaging the corner grooves in neighboring enclosures on four separate storage racks.

16. Nuclear fuel storage rack comprising a plurality of elongated, corner-adjoining, parallel modular enclosures each of generally rectangular cross-section having interior slots for receiving fuel elements, structural means distributed along their length and permanently joining each of the fuel receiving enclosures to its neighboring enclosures at their corners in a checkerboard array to form a rigid honeycomb structure wherein the walls of individual enclosures through their corner connections form a plurality of rigid transverse shear walls extending across the rack and wherein the number of fuel-receiving slots present is approximately equal to twice the number of the enclosures present, and means for mounting said honeycomb structure within a fuel storage pool.

17. Nuclear fuel storage rack as claimed in claim 16 and further including a top stiffening frame secured to the top of the honeycomb structure at each enclosure.

18. Nuclear fuel storage rack as claimed in claim 17 wherein the enclosures have at their corners longitudinally-extending, outwardly projecting corner pieces, and the corner joining means join together the enclosures at the outwardly projecting corner pieces.

* * * * *